Feb. 7, 1928.
F. WEISS
1,658,504
TOOL WITH DETACHABLE HANDLE
Filed Aug. 2, 1926
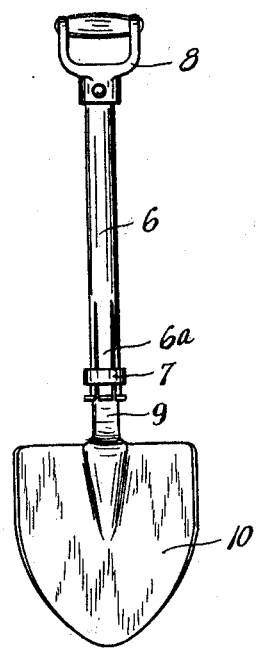
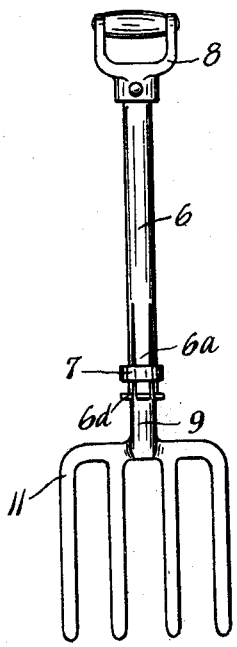
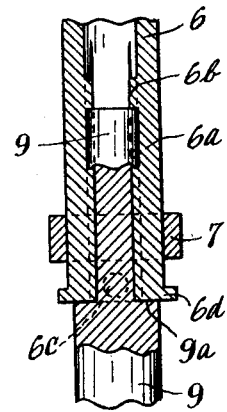
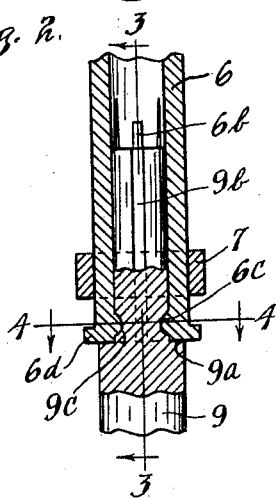
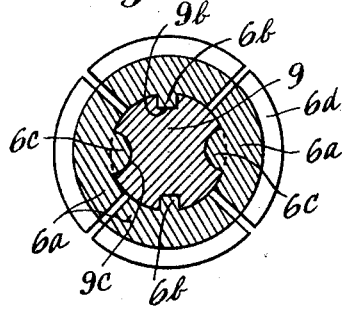
INVENTOR.
FRED WEISS.
BY HIS ATTORNEYS.

Patented Feb. 7, 1928.

1,658,504

UNITED STATES PATENT OFFICE.

FRED WEISS, OF MINNEAPOLIS, MINNESOTA.

TOOL WITH DETACHABLE HANDLE.

Application filed August 2, 1926. Serial No. 126,384.

This invention has for its general object to provide an improved detachable handle which will accommodate various types of tools. It is particularly an object of the invention to provide such a handle upon which a tool such as a spade may be detachably fixed so that the same may be disassembled to take up but small length space and can be stowed away, for example, inside the body of an automobile or in a soldier's pack sack.

These and other objects and advantages will more fully appear from the following description made in connection with the accompanying drawings in which like reference characters refer to the same or similar parts throughout the various views, and in which Fig. 1 is a view in front elevation of the device applied to a shovel;

Fig. 2 is a longitudinal section taken through the clamping joint of the tool;

Fig. 3 is a longitudinal section taken on the line 3—3 of Fig. 2, as indicated by the arrows;

Fig. 4 is a horizontal section taken on the line 4—4 of Fig. 2, as indicated by the arrows; and Fig. 5 is a view in front elevation showing the device applied to a fork.

In the drawings, a handle member shown as a tube 6 is provided having at its lower end the split portions 6$^a$ provided with inwardly extending tongues 6$^b$ extending longitudinally of the split portions and preferably being oppositely disposed thereon. Inwardly projecting tabs or lugs 6$^c$ are formed preferably at the lower end of the split portions of the tube and preferably oppositely disposed thereon. The lower outer ends of the split portions of the tube 6 form a flange 6$^d$. A ring 7 having a bore of a radius approximately equal to the radius of the outer surface of the tube 6 is placed over the tube. A handle, as handle 8, may be secured to the upper end of the tube. A shank 9 having a shoulder 9$^a$ formed therein is provided and may have secured thereto at its lower end a tool such, for example, as the shovel 10 or the fork 11. The shank 9 is reduced in diameter upwardly from the shoulder 9$^a$ and has formed in the reduced portion the longitudinal grooves 9$^b$ preferably on opposite sides thereof, said grooves being of a size to accommodate the longitudinal tongues 6$^b$ of the tube 6. Recesses 9$^c$ are also provided, being formed on the reduced portion of shank 9 preferably adjacent the shoulder 9$^a$ and preferably at opposite points on the shank, said recesses being of a size to form seats for the lugs 6$^c$. The tube 6 is preferably composed of metal such as iron so that some little resiliency will be given to the split portions 6$^a$.

To secure the shank 9 in the tube 6, the ring 7 is first raised upwardly from the split portions 6$^a$. The grooves 9$^b$ of the shank are then alined with the tongues 6$^b$ and the shank and the tube are pressed together, the tongues sliding in said grooves. The lugs 6$^c$ being rounded will slide over the reduced portion of the shank, the split portions 6$^a$ of the tube being sprung outwardly as the tube and shank are joined together. When the lower end of the tube 6 contacts the shoulder 9$^a$ in the shank, the lugs 6$^c$ will spring inwardly to seat within the recesses 9$^c$ of the shank due to the resiliency of the split portions 6$^a$. The ring 7 may now be slid downwardly on the tube 6 and forced over the split portions of the tube. There will be a tendency for the split portions 6$^a$ to spring slightly outwardly and accordingly when the ring 7 is lowered to the position shown in the drawings, the same will be held under some resilient tension. The shank 9 and the tube 6 will now be securely clamped together and the device is ready for use. Various shanks 9 having different types of tools thereon may be used in connection with the tube 6.

When such a tool as the shovel 10 is being used, as the shovel is pressed into the ground, there will be no tendency for the parts to release themselves from each other, as pressure applied to the handle 8 or the tube 6 will be applied directly against the shoulder 9$^a$ of the shank. As the shovel is withdrawn from the ground, the lugs 6$^c$, seated in the recesses 9$^c$, will prevent the tube 6 from being withdrawn from the shank 9. Relative rotative movement between the tube 6 and the shank 9 will be prevented by means of the tongues 6$^b$ seated within the grooves 9$^b$.

To dismember the device, the ring 7 is simply forced upwardly towards the top of the tube 6 and the tube and the shank pulled apart. The parts of the device can then be so positioned as to take up but little length space. Flange 6$^d$ prevents removal of ring 7 from the tube.

The number and the positioning of tongues, grooves, lugs and recesses may be varied as desired. Although the tongues and lugs are illustrated as being formed on the tube while the grooves and recesses are shown as being formed in the shank, this arrangement may be varied for ease in manufacture or other reasons if desired. It will, of course, be understood that various changes may be made in the form, details, arrangement and proportions of the various parts without departing from the scope of the present invention which, generally stated, consists of the matter shown and described and set forth in the appended claims.

What is claimed is:

1. A tool with a detachable handle, comprising a tubular handle member having a split portion at its lower end with an outwardly projecting flange at the extreme end of said split portion, longitudinal tongues projecting inwardly from the inside of said split portion, and lugs projecting inwardly from the lower end of said split portion, a shank having a tool fixed thereto, said shank being adapted to fit within said split portion, said shank having longitudinal grooves within which said tongues are adapted to fit, a shoulder against which said handle member is adapted to abut when said members are joined, and recesses within which said lugs may seat when said handle member and said shank are joined, and said handle member abuts the shoulder on said shank member, and a ring fitting over said handle member and adapted to be slid downwardly thereon towards said flange to embrace said split portion when said shank is placed therein.

2. A device of the class described comprising two members, one of said members having a split hollow receiving end and the other of said members having an end portion adapted to be received within said receiving end of said first member, said second member having a shoulder thereon against which the end of said first member is adapted to abut when said members are joined, one of said members having lugs thereon and the other of said members having recesses formed therein, said lugs being adapted to fit within said recesses when said members are joined and said first member abuts the shoulder of said second member and a ring fitting over said first member and adapted to be forced over the split end thereof to tightly hold said members in engagement when joined.

3. A device of the class described comprising two members, one of which is hollow and split adjacent one end to receive one end of the other member, longitudinal grooves on one of said members, longitudinal tongues on the other of said members adapted to fit within said grooves, the receivable member having a shoulder thereon against which the receiving member is adapted to abut when said members are joined, lugs on one of said members and recesses in the other of said members adapted to receive said lugs when said members are joined and said receiving member abuts said shoulder on said receivable member and a ring fitting over said receiving member and adapted to be forced over the split portion thereof when said members are joined.

In testimony whereof I affix my signature.

FRED WEISS.